(12) United States Patent
Loiacono

(10) Patent No.: US 8,562,902 B2
(45) Date of Patent: *Oct. 22, 2013

(54) DIRECT SMELTING PLANT

(75) Inventor: Robert Loiacono, Subiaco (AU)

(73) Assignee: Technologies Resources Pty Limited, Melbourne, Victoria (AU)

( * ) Notice: Subject to any disclaimer, the term of this patent is extended or adjusted under 35 U.S.C. 154(b) by 437 days.

This patent is subject to a terminal disclaimer.

(21) Appl. No.: 12/281,290

(22) PCT Filed: Mar. 1, 2007

(86) PCT No.: PCT/AU2007/000249
§ 371 (c)(1),
(2), (4) Date: May 4, 2009

(87) PCT Pub. No.: WO2007/098552
PCT Pub. Date: Sep. 7, 2007

(65) Prior Publication Data
US 2009/0309275 A1     Dec. 17, 2009

(30) Foreign Application Priority Data

Mar. 1, 2006 (AU) .............................. 2006901032

(51) Int. Cl.
*C21C 5/40* (2006.01)
(52) U.S. Cl.
USPC ........................................ 266/144; 266/225
(58) Field of Classification Search
USPC .................................. 266/143, 144, 142, 225
See application file for complete search history.

(56) References Cited

U.S. PATENT DOCUMENTS

| 5,489,325 A | 2/1996 | Keogh et al. |
| 5,865,876 A | 2/1999 | Watkins et al. |

(Continued)

FOREIGN PATENT DOCUMENTS

| EP | 0 446 860 A1 | 9/1991 |
| EP | 1 652 941 A2 | 5/2006 |

(Continued)

OTHER PUBLICATIONS

Malgarini, G. et al.;"First Results from CleanSMelt Ironmaking pilot plant," Aise Steel Technology, Pittsburgh, PA, [Iron and Steel Engineer] vol. 74, No. 1, Jan. 1, 1997, pp. 30-31; XP000640994,, ISSN: 0021-1559.

*Primary Examiner* — Scott Kastler
(74) *Attorney, Agent, or Firm* — Banner & Witcoff, Ltd.

(57) ABSTRACT

A direct smelting plant for producing molten metal from a metalliferous feed material using a molten bath based direct smelting process is disclosed. The plant includes a plurality of crane access zones that are outboard of a gas delivery main to enable solids injection lances to be removed from and replacement lances to be positioned in openings in a side wall of a direct smelting vessel. The plant also includes a plurality of crane access zones that are inboard of the gas delivery main to enable gas injection lances to be removed from and replacement lances to be positioned in openings in the side wall of the vessel.

31 Claims, 13 Drawing Sheets

(56) References Cited

U.S. PATENT DOCUMENTS

| | | | |
|---|---|---|---|
| 6,368,548 B1 * | 4/2002 | Innes | 266/171 |
| 6,379,424 B1 | 4/2002 | Dry | |
| 6,399,016 B2 | 6/2002 | Burrow | |
| 6,423,114 B1 | 7/2002 | Burke | |
| 6,989,126 B2 * | 1/2006 | Leigh | 266/83 |
| 7,201,868 B2 | 4/2007 | Ions et al. | |
| 7,947,217 B2 | 5/2011 | Goodman et al. | |
| 8,156,709 B2 | 4/2012 | Ions et al. | |
| 2003/0011114 A1 | 1/2003 | Dunne et al. | |
| 2004/0256773 A1 | 12/2004 | Dry et al. | |
| 2008/0202061 A1 | 8/2008 | Ions et al. | |
| 2009/0166937 A1 * | 7/2009 | Hayton et al. | 266/207 |
| 2009/0194919 A1 * | 8/2009 | Dry et al. | 266/236 |
| 2009/0218737 A1 * | 9/2009 | Hayton et al. | 266/225 |

FOREIGN PATENT DOCUMENTS

| | | |
|---|---|---|
| JP | 2000-146452 | 5/2000 |
| WO | WO 96/31627 | 10/1996 |
| WO | WO 98/42878 A1 | 10/1998 |
| WO | WO 00/22176 A1 | 4/2000 |
| WO | WO 02/24963 A1 | 3/2002 |
| WO | WO 2004/090173 A1 | 10/2004 |
| WO | WO 2005/080608 A1 | 9/2005 |
| WO | WO 2005/090613 A1 | 9/2005 |
| WO | WO 2006/010208 A1 | 2/2006 |
| WO | WO 2006/010210 A1 | 2/2006 |

* cited by examiner

DIRECT SMELTING PLANT

CROSS REFERENCE TO RELATED APPLICATION

This application is a national phase application based on PCT/AU2007/000249, filed Mar. 1, 2007, which claims the priority of Australian Patent Application No. 2006901032, filed Mar. 1, 2006, the content of both of which is incorporated herein by reference.

TECHNICAL FIELD

The present invention relates to a direct smelting plant for producing molten metal from a metalliferous feed material such as ores, partly reduced ores and metal-containing waste streams.

A known direct smelting process, which relies principally on a molten bath as a reaction medium, and is generally referred to as the HIsmelt process, is described in International Application PCT/AU96/00197 (WO 96/31627) in the name of the applicant. The disclosure in the International application is incorporated herein by cross reference.

The HIsmelt process as described in the International application in the context of producing molten iron includes:

(a) forming a bath of molten iron and slag in a direct smelting vessel;

(b) injecting into the bath: (i) a metalliferous feed material, typically iron oxides; and (ii) a solid carbonaceous material, typically coal, which acts as a reductant of the iron oxides and a source of energy; and (c) smelting metalliferous feed material to iron in the metal layer.

The term "smelting" is herein understood to mean thermal processing wherein chemical reactions that reduce metal oxides take place to produce molten metal.

The HIsmelt process also includes post-combusting reaction gases, such as CO and $H_2$, released from the bath in the space above the bath with oxygen-containing gas and transferring the heat generated by the post-combustion to the bath to contribute to the thermal energy required to smelt the metalliferous feed materials.

The HIsmelt process also includes forming a transition zone above the nominal quiescent surface of the bath in which there is a favourable mass of ascending and thereafter descending droplets or splashes or streams of molten metal and/or slag which provide an effective medium to transfer to the bath the thermal energy generated by post-combusting reaction gases above the bath.

In the HIsmelt process the metalliferous feed material and solid carbonaceous material are injected into the molten bath through a number of lances/tuyeres which are inclined to the vertical so as to extend downwardly and inwardly through the side wall of the direct smelting vessel and into a lower region of the vessel so as to deliver at least part of the solid materials into the metal layer in the bottom of the vessel. To promote the post-combustion of reaction gases in the upper part of the vessel, a blast of hot air, which may be oxygen-enriched, is injected into an upper region of the vessel through a downwardly extending hot air injection lance. Offgas resulting from the post-combustion of reaction gases in the vessel is taken away from the upper part of the vessel through an offgas duct. The vessel includes refractory-lined water cooled panels in the side wall and the roof of the vessel, and water is circulated continuously through the panels in a continuous circuit.

The HIsmelt process enables large quantities of molten metal, such as molten iron, to be produced by direct smelting in a single compact vessel. In order to achieve this it is necessary to transport large quantities of hot gas to and from the direct smelting vessel, transport large quantities of the metalliferous feed material, such as iron-containing feed materials, to the vessel, transport large quantities of the molten metal product and slag produced in the process away from the vessel, and circulate large quantities of water through the water cooled panels—all within a relatively confined area. These functions must continue throughout a smelting operation—which desirably extends over at least 12 months. It is also necessary to provide access and handling facilities to enable access to the vessel and lifting of equipment between smelting operations.

A commercial HIsmelt direct smelting plant based on a 6 m diameter vessel (internal diameter of refractory hearth) has been constructed at Kwinana, Western Australia. The plant is designed to operate the HIsmelt process and produce 800,000 tonnes per year of molten iron in the vessel.

The applicant has now carried out research and development work to design a larger scale commercial HIsmelt direct smelting plant to produce in excess of 1 million tonnes per year of molten iron via the HIsmelt process.

The applicant has been confronted with a number of problems in scaling up the HIsmelt process and has produced an alternate design for a HIsmelt direct smelting plant.

The present invention relates to a direct smelting plant that is an alternative design for the commercial HIsmelt direct smelting plant mentioned above.

The direct smelting plant of the present invention can also be used to carry out other direct smelting processes.

DISCLOSURE OF THE INVENTION

According to the present invention there is provides a direct smelting plant for producing molten metal from a metalliferous feed material using a molten bath based direct smelting process that includes:

(a) a fixed direct smelting vessel to hold a molten bath of metal and slag and a gas space above the bath, the vessel including a hearth and a side wall;

(b) a solids feed assembly to supply solid feed material, including metalliferous feed material and carbonaceous material, from a solid feed material supply location away from the vessel into the vessel, the solids feed assembly including a plurality of solids injection lances extending through openings in the side wall of the vessel;

(c) an oxygen-containing gas feed assembly to supply an oxygen-containing gas from an oxygen-containing gas supply location away from the vessel into the vessel, the oxygen-containing gas feed assembly including a gas delivery main and a plurality of gas injection lances extending through openings in the side wall of the vessel to inject the oxygen-containing gas supplied via the gas delivery main into the vessel, the gas delivery main extending at least substantially around the vessel and spaced away from the vessel;

(d) an offgas duct assembly to facilitate flow of offgas from the vessel;

(e) a metal tapping assembly to tap molten metal from the bath during a smelting operation;

(f) a slag tapping assembly to tap slag from the bath during a smelting operation; and (g) a plurality of crane access zones that are outboard of the gas delivery main to enable the solids injection lances to be removed from and replacement lances to be positioned in the openings in the side wall of the vessel.

Preferably the gas delivery main is spaced away from the vessel so that there is a clearance between the vessel and the gas delivery main that makes it possible to remove the gas injection lances through the clearance, and the plant includes a plurality of crane access zones that are inboard of the gas delivery main to enable the gas injection lances to be removed from and replacement lances to be positioned in the openings in the side wall of the vessel.

Preferably the gas delivery main is located above connections of the gas injection lances to the vessel.

Preferably the gas delivery main is a ring main that defines an endless path for gas flow within the main.

Preferably the gas delivery main is a horseshoe main.

Preferably each gas injection lance is arranged to direct a stream of gas downwardly and outwardly of a central core of the vessel.

Preferably each gas injection lance is arranged to direct a stream of gas downwardly and outwardly towards the side wall of the vessel.

Preferably each gas injection lance is positioned such that the lance points downwardly into the vessel and is angled in relation to a vertical plane and a radial plane in the vessel so that the direction of flow of a stream of gas from the lance has radial and circumferential components.

Preferably the solids feed assembly includes a plurality of solids injection lances that extend downwardly and inwardly through openings in the side wall of the vessel, and the solids injection lances include a plurality of lances to inject metalliferous material into the vessel and a plurality of lances to inject solid carbonaceous material into the vessel, the metalliferous material injection lances being positioned in pairs around the perimeter of the side wall of the vessel, and a single solid carbonaceous material injection lance being positioned between adjacent pairs of the metalliferous material injection lances.

Preferably the solids feed assembly includes a main supply line for each pair of metalliferous injection lances and a pair of branch lines that extend from the main line and are connected to the lances.

Preferably the solids feed assembly includes a hot metalliferous feed material injection system for supplying preheated metalliferous feed material into the main supply line for each pair of the metalliferous feed material injection lances.

Preferably the plant includes a superstructure that supports the gas delivery main.

Preferably the superstructure also includes a plurality of platforms that provide workman access to the vessel at different heights of the vessel.

Preferably the offgas duct assembly extends from the upper cylindrical section.

Preferably the transition section includes the openings for the gas injection lances and the lances extend through the openings into the vessel.

Preferably the lower cylindrical section includes the openings for the solids injection lances, and the lances extend through the openings into the vessel.

Preferably the metalliferous material includes iron ore.

Preferably the carbonaceous material includes coal.

According to the present invention there is also provided a direct smelting plant for producing molten metal from a metalliferous feed material using a molten bath based direct smelting process that includes:

(a) a fixed direct smelting vessel to hold a molten bath of metal and slag and a gas space above the bath, the vessel including a hearth and a side wall;

(b) a solids feed assembly to supply solid feed material, including metalliferous feed material and carbonaceous material, from a solid feed material supply location away from the vessel into the vessel, the solids feed assembly including a plurality of solids injection lances extending through openings in the side wall of the vessel;

(c) an oxygen-containing gas feed assembly to supply an oxygen-containing gas from an oxygen-containing gas supply location away from the vessel into the vessel, the oxygen-containing gas feed assembly including a gas delivery main and a plurality of gas injection lances extending through openings in the side wall of the vessel to inject the oxygen-containing gas supplied via the gas delivery main into the vessel, the gas delivery main extending at least substantially around the vessel and spaced away from the vessel so that there is a clearance between the vessel and the gas delivery main that makes it possible to remove the gas injection lances through the clearance;

(d) an offgas duct assembly to facilitate flow of offgas from the vessel;

(e) a metal tapping assembly to tap molten metal from the bath during a smelting operation;

(f) a slag tapping assembly to tap slag from the bath during a smelting operation; and (g) a plurality of crane access zones that are inboard of the gas delivery main to enable the gas injection lances to be removed from and replacement lances to be positioned in the openings in the side wall of the vessel.

Preferably the plant further includes cooling water header pipes for supply of cooling water to the vessel, the cooling water header pipes located above the gas feed assembly and a plurality of cooling water supply and return pipes extending between the cooling water headers and the vessel and distributed about the cooling water header pipes intermediate the crane access zones positioned inboard of the gas delivery main.

Preferably the cooling water supply and return

Preferably the crane access zones for the solids injection lances are inboard of an outer perimeter of the superstructure.

Preferably the offgas duct assembly includes two offgas ducts extending outwardly from the vessel.

Preferably the offgas ducts are of matching diameter.

Preferably the offgas ducts are of matching length.

Preferably the plant includes two offgas hoods to cool offgas, with one the offgas hood being connected to one the offgas duct.

Preferably each offgas hood is adapted to cool offgas to a temperature of the order of 900-1100° C.

Preferably the plant includes a separate offgas scrubber to remove particulates from offgas that is connected to each offgas hood.

Preferably the plant includes a single offgas cooler connected to both offgas scrubbers.

Preferably the side wall of the vessel includes:

(a) a lower cylindrical section, (b) an upper cylindrical section that has a smaller diameter than the lower section, and (c) a transition section that interconnects the upper and lower sections. pipes are distributed about the cooling water header pipes so as to provide, at least in part, one or more external peripheries of the crane access zones positioned inboard of the gas delivery main.

Preferably the water supply and return pipes are distributed about the cooling water headers in a plurality of separate zones that are spaced apart from one another.

Preferably the cooling water headers extend at least substantially around the vessel.

Preferably the cooling water headers are located vertically above and in substantial alignment with the gas delivery main of the gas feed assembly.

Preferably the plant further includes a plurality of cooling water headers extending substantially around the vessel, and located at different vertical heights so as to supply water to different areas of the vessel and the headers in substantial alignment with the gas delivery main of the gas feed assembly.

BRIEF DESCRIPTION OF THE DRAWINGS

The present invention is described in more detail hereinafter by way of example with reference to the accompanying drawings, of which.

DETAILED DESCRIPTION OF THE EMBODIMENT

Figure 1:
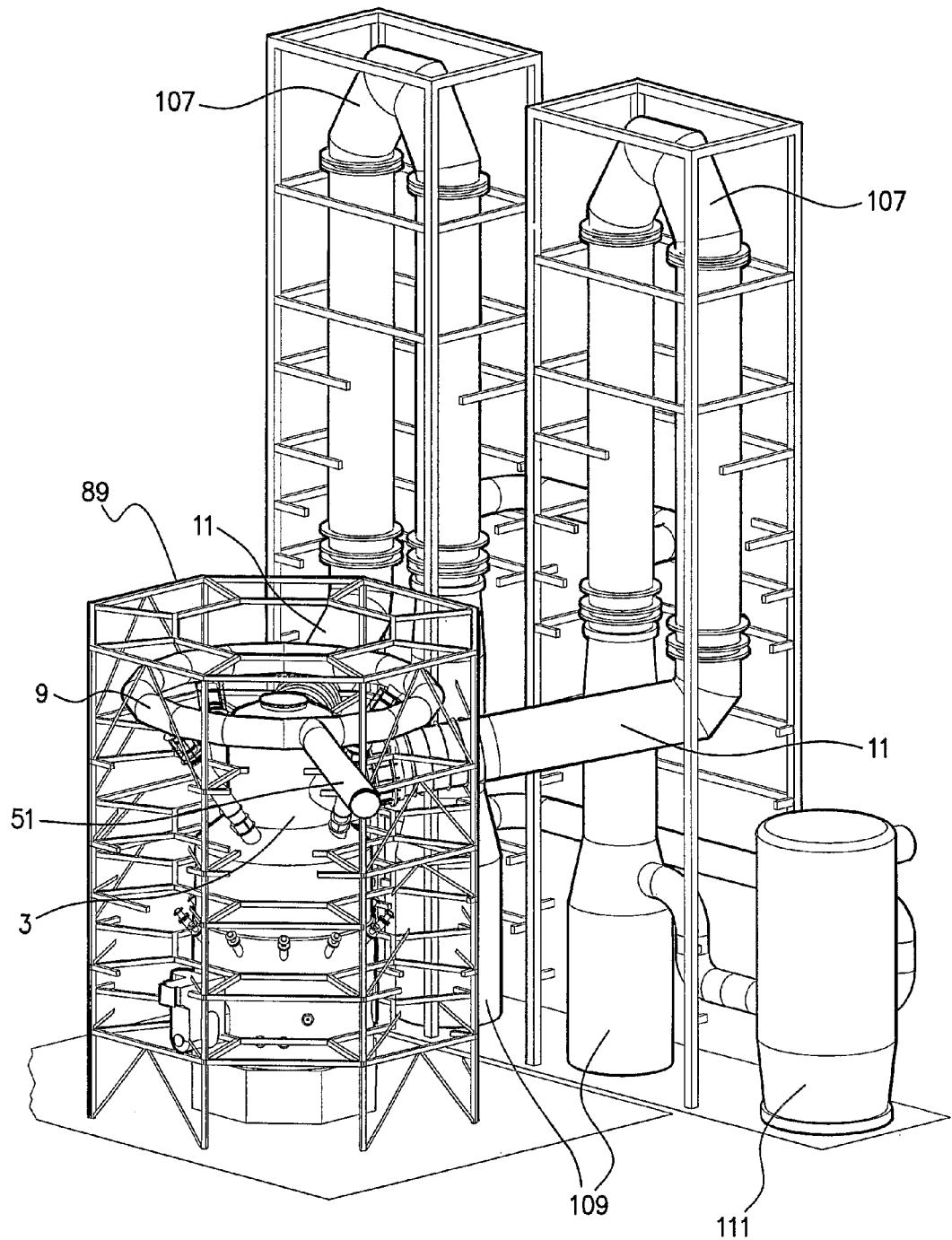
FIGS. 1 and 2 are perspective views from two different directions which illustrates a direct smelting vessel and a part of an off-gas duct system that forms part of one embodiment of a direct smelting plant in accordance with the present invention.

The direct smelting plant shown in the Figures is suitable particularly for smelting metalliferous material in accordance with the HIsmelt process as described in International patent application PCT/AU96/00197 (WO 96/00197).

The plant is not confined to smelting metalliferous material in accordance with the HIsmelt process.

The following description is in the context of smelting iron ore fines to produce molten iron in accordance with the HIsmelt process.

The present invention is not confined to the production of molten iron and extends to direct smelting any metalliferous material.

The following description focuses on a direct smelting vessel of the direct smelting plant and apparatus, such as solids and gas injection lances, that are directly associated with the vessel.

The direct smelting plant also includes other apparatus, including apparatus for processing feed materials for the vessel upstream of the vessel and apparatus for processing products (molten metal, molten slag, and offgas) produced in the vessel. Such other apparatus is not described herein in detail because it is not the focus of the present invention but it nevertheless forms part of the plant. Such other apparatus is described in other patent applications and patents in the name of the applicant and the disclosure in these patent applications and patents is incorporated herein by cross-reference.

Figure 2:
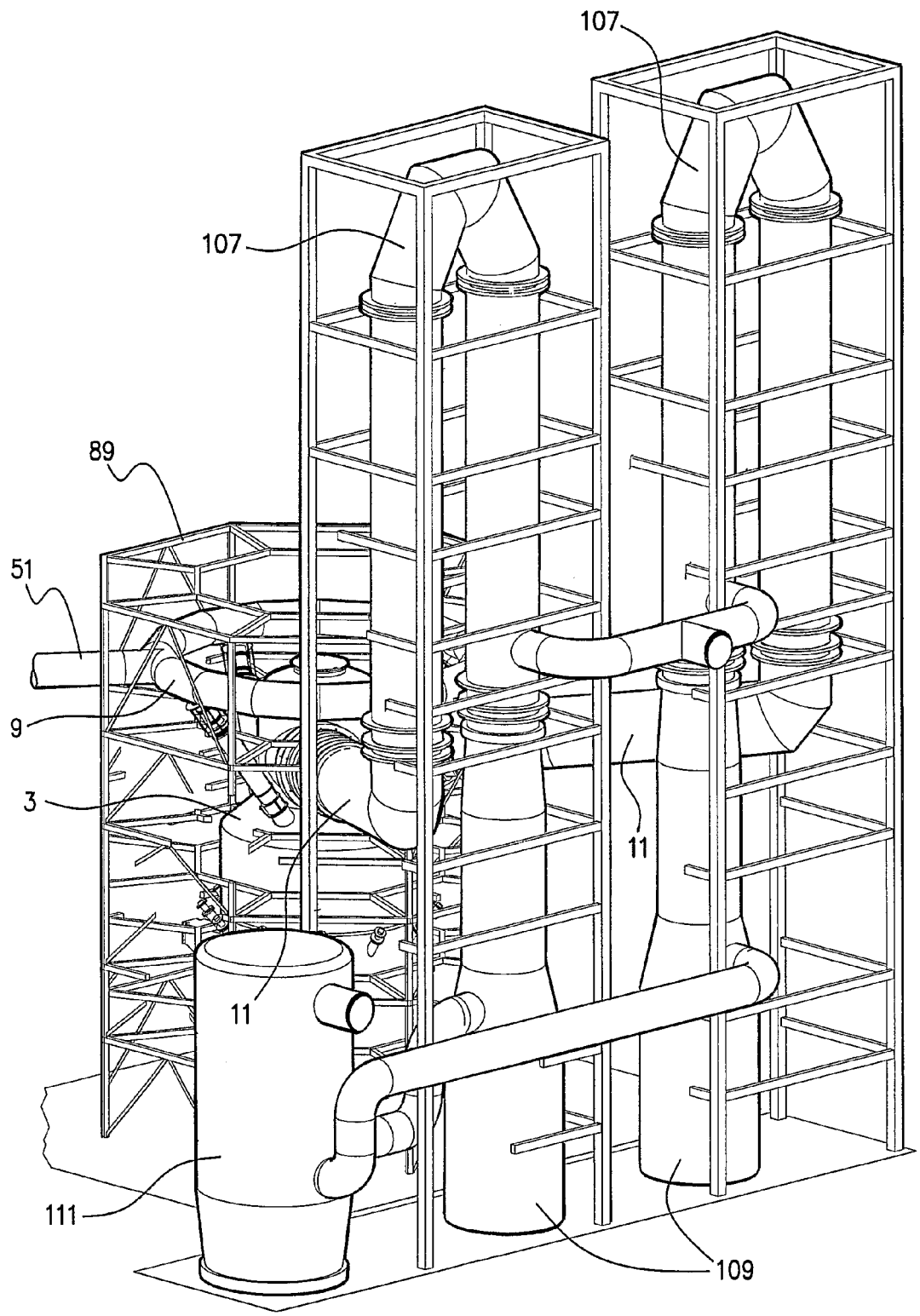
Figure 10:
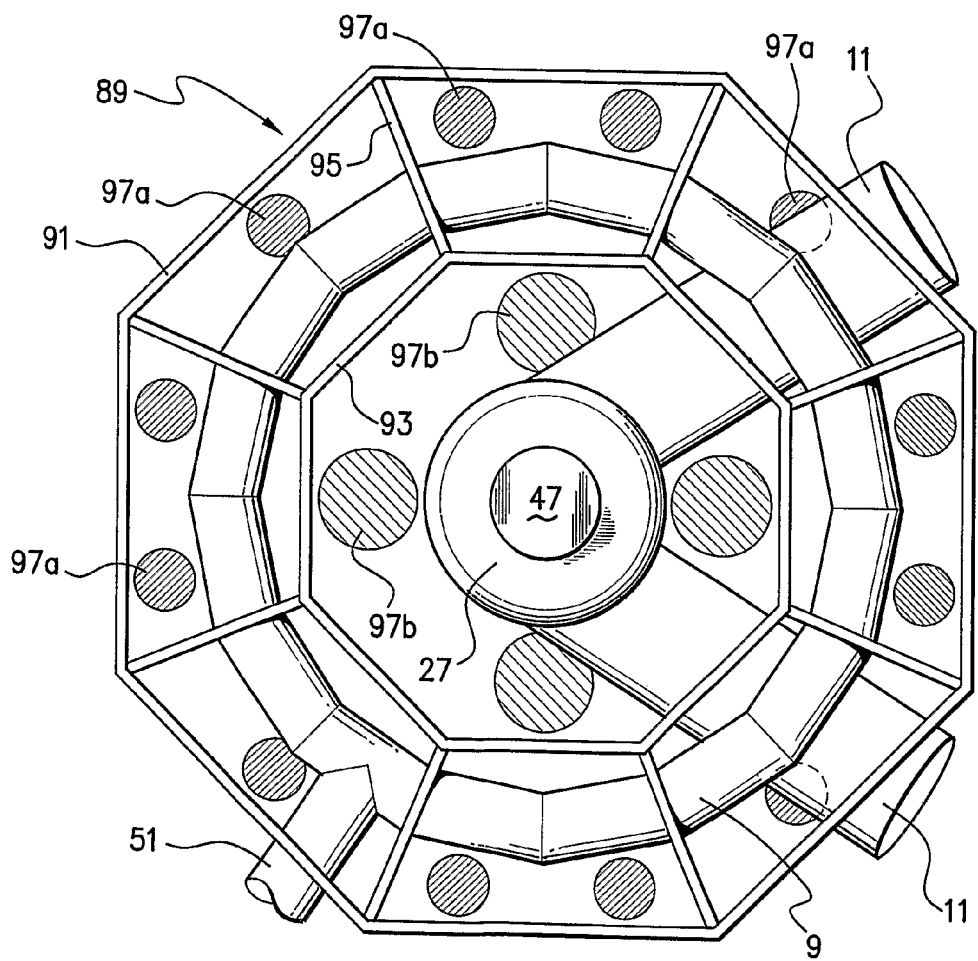
FIG. 10 is a diagrammatic top plan view of selected components of the vessel that illustrates extraction and insertion envelopes for the solids injection lances and the hot air injection lances from the vessel.

With reference to the Figures, in the context of the present invention, the main features of the embodiment of the direct smelting plant shown in the Figures are:

(a) a fixed direct smelting vessel 3 to contain a molten bath 41 of metal and slag and a gas space 43 above the bath;

(b) a solid feed assembly that includes 12 solids injection lances 5*a*, 5*b* to supply solid feed material, including metalliferous feed material and carbonaceous material, into the vessel;

(c) an oxygen-containing gas feed assembly to supply an oxygen-containing gas to the vessel which includes:

(c)(i) a gas injection assembly in the form of 4 gas injection lances 7 to inject the oxygen-containing gas into the gas space and/or the bath in the vessel; and (c)(ii) a gas delivery duct assembly that includes a ring main 9 and a plurality of members 49, one associated with each gas injection lance 7, that connect the ring main 9 and the gas injection lances 7 to deliver the oxygen-containing gas, typically air or oxygen-enriched air, to the gas injection lances 7; and (d) an offgas duct assembly that includes two offgas ducts 11 to facilitate flow of offgas from the vessel away from the vessel;

With reference to FIGS. 1, 2, and 10, it is relevant to note at this point that the direct smelting plant also includes a superstructure 89 formed from steel beams assembled together to define an octagonal-shaped outer perimeter 91, an octagonal-shaped inner perimeter 93 and a series of cross-members 95 interconnecting the perimeter beams. The superstructure 89 supports the ring main 9 of the gas delivery duct assembly via hangers (not shown). The superstructure also includes a plurality of platforms (not shown) that provide workman access to the vessel 3 at different heights of the vessel 3.

The vessel 3 includes (a) a hearth that includes a base 21 and sides 23 formed from refractory bricks, (b) a side wall 25 that extends upwardly from the hearth, and (c) a torispherical roof 27. In order to place the size of the vessel 3 into context, a vessel 3 that is designed to produce 2 million tones per year of molten iron requires a hearth diameter (internal) of around 8 m.

The side wall 25 of the vessel 3 is formed so that the vessel includes (a) a lower cylindrical section 29, (b) an upper cylindrical section 31 that has a smaller diameter than the lower section 29, and (c) a frusto-conical section 33 that interconnects the two sections 29, 31.

It is evident from the following description and the drawings that the 3 sections 29, 31, 33 of the side wall 25 of the vessel divide the side wall 25 into 3 separate zones. The lower section 29 supports the solids injection lances 5*a*, 5*b*. The frusto-conical section 33 supports the gas injection lances 7. Finally, the upper section 33 in effect, is an offgas chamber from which offgas leaves the vessel.

Figure 5:
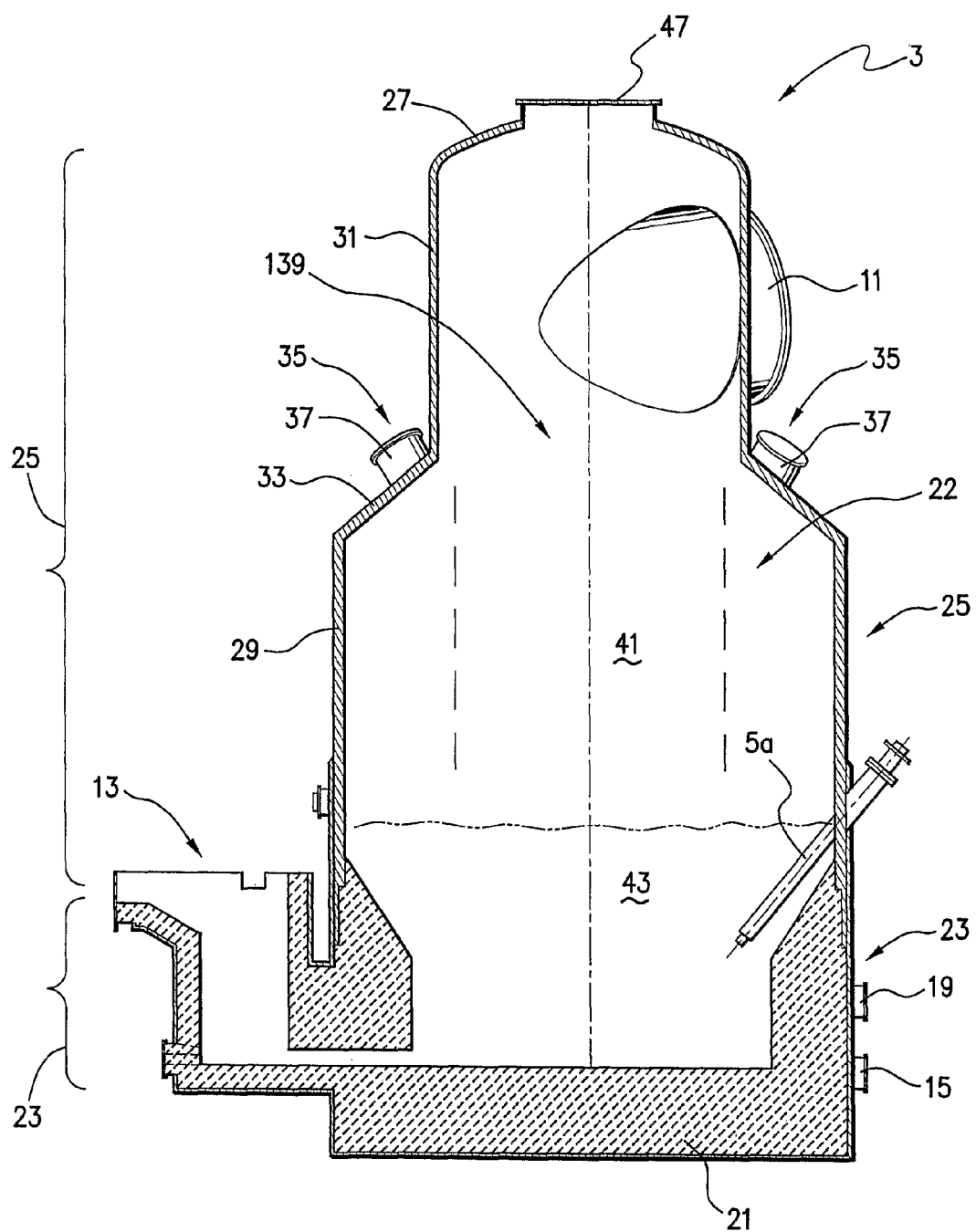
FIG. 5 is a side elevation of the vessel which illustrates the layout of refractory bricks in the interior of the vessel.

The side wall 25 and the roof 27 of the vessel 3 support a plurality of water-cooled panels (not shown) and the plant includes a cooling water circuit. With reference to FIG. 5, the upper section 33 includes single steel panels and the lower section 29 includes double steel panels. The cooling water circuit supplies water to and removes heated water from the water-cooled panels and thereafter extracts heat from the heated water before returning the water to the water-cooled panels.

The frusto-conical section 33 of the side wall 25 of the vessel 3 includes openings 35 for the gas injection lances 7. The lances 7 extend through the openings 35. The lance openings 35 include mounting flanges 37, and the lances 7 are mounted on and supported by the flanges 37. The lance openings 35 are at the same height of the vessel 3 and are positioned at equi-spaced intervals around the perimeter of the side wall 25 of the vessel 3.

With reference to FIG. 5, in use of the vessel 3 to smelt iron ore fines to produce molten iron in accordance with the HIsmelt process, the vessel 3 contains a molten bath 41 of iron and slag which includes a layer (not shown) of molten metal contained in the hearth of the vessel 3 and a layer (not shown) of molten slag on the metal layer 22. The molten bath 41 shown in FIG. 5 is under quiescent conditions—i.e. under conditions in which there is no solids and gas injection into the vessel 3. Typically, when the HIsmelt process is operating in the vessel 3 to produce 2 million tones per year of molten iron, the vessel 3 contains 500 tonnes of molten iron and 700 tonnes of molten slag.

Figure 3:
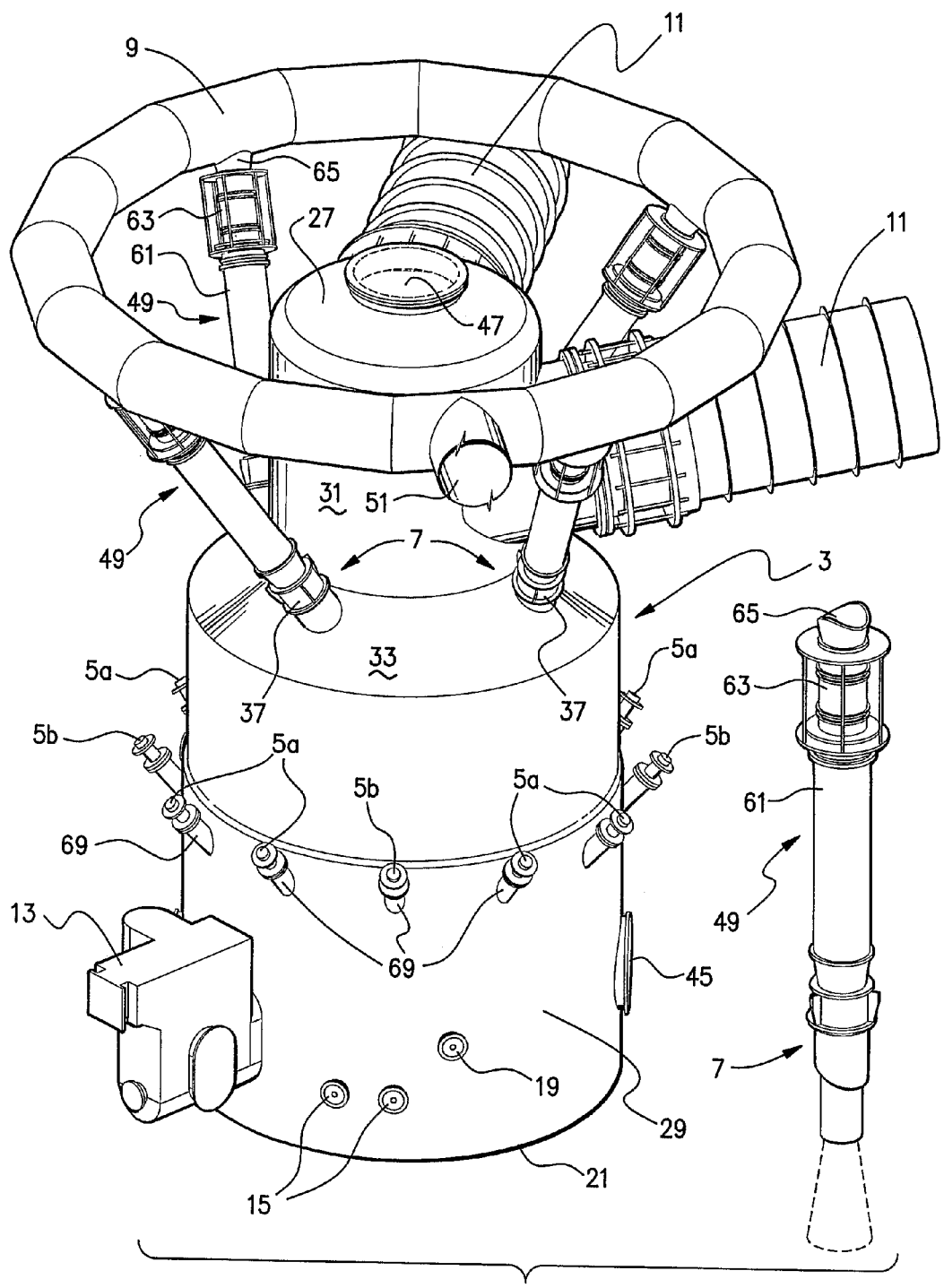
FIG. 3 is a perspective view of the vessel.
Figure 4:
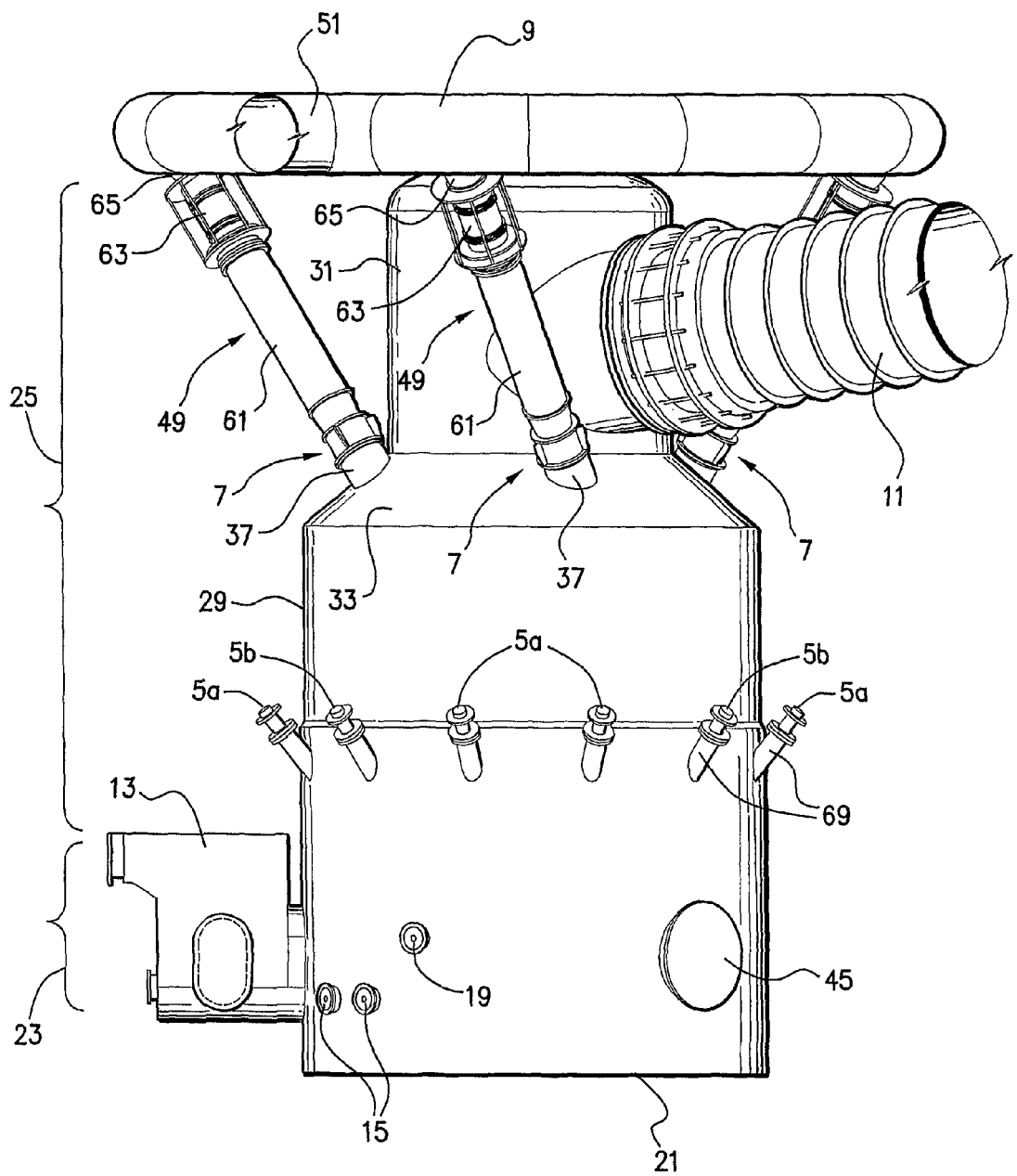
FIG. 4 is side elevation of the vessel.

With reference to FIGS. 3 and 4, the vessel 3 also includes 2 access doors 45 in the side 23 of the hearth to allow access to the interior of the vessel 11 for re-lining or other maintenance work in the interior of the vessel.

The access doors 45 are in the form of steel plates that are welded to the sides 23. When access to the interior of the vessel 3 is required, the plates are cut away from the side 23 of the hearth and replacement plates are welded in position after the work in the vessel 3 has been completed. The access doors 45 are at the same height of the vessel 3. The access doors 45 are spaced at least 90° apart around the circumference of the vessel 3. This spacing makes it possible for refractory wall demolition equipment to extend through the doors 45 into the vessel and demolish a substantial part of the refractories of a refractory-lined side wall while the vessel is hot. In addition, the access doors 45 are sufficiently large, typically 2.5 m in diameter, to allow bob-cat or similar equipment access to the interior of the vessel 3.

With reference to FIG. 3, the vessel 3 also includes a similar access door 47 in the roof 27 of the vessel 3 to allow access to the interior of the vessel 11 for re-lining or other maintenance work in the interior of the vessel 3.

In use, the four gas injection lances 7 of the gas injection assembly inject an oxygen-enriched hot air blast from a hot gas supply station (not shown) located some distance away from the reduction vessel 11. The hot gas supply station includes a series of hot gas stoves (not shown) and an oxygen plant (not shown) to enable an oxygen-enriched air stream to be passed through the hot gas stoves and into a hot gas delivery duct 51 (FIGS. 2 and 11) which is connected to the ring main 9. Alternatively, oxygen may be added to an air stream after the air stream has been heated by the stoves.

The purpose of the gas injection lances 7 is to inject a sufficient flow rate of the oxygen-enriched hot air at a sufficient velocity so that the hot air penetrates a fountain, typically an annular fountain, of molten metal and slag that is projected upwardly within the vessel 3 as part of the HIsmelt process and the oxygen-enriched hot air combusts combustible gas, such as carbon dioxide and hydrogen released from the bath, that is in the fountain. Combustion of the combustible gas produces heat that is transferred to the molten bath when the molten metal and slag moves back downwardly into the bath.

The gas injection lances 7 are straight-forward injection lances in terms of basic construction and do not include swirlers for imparting swirl to oxygen-enriched air flowing through the lances. As is indicated above, research work of the applicant found that gas injection lances 7 operating without swirl could achieve comparable performance to lances operating with swirl.

The gas injection lances 7 extend downwardly through the frusto-conical section 33 of the side wall 25 of the vessel 3 into the upper region of the vessel 3. The lances 7 are equi-spaced around the frusto-conical section 33 and are at the same height. The lances 7 are positioned to extend downwardly and outwardly to inject hot air towards the lower section 29 of the side wall 25. It is important to note that it is undesirable that oxygen-containing gas contact the side wall 25 of the vessel—high temperatures generated by combustion at the side wall are undesirable from the viewpoint of vessel life. Consequently, the lances 7 are arranged so that tips 53 of the lances 7 are points on a horizontal circle.

The above-described downward and outward injection of oxygen-containing off-gas is also desirable from the viewpoint of avoiding combustion of reaction gases, such as CO, in a central vertical core of the vessel, generally identified by the numeral 139, in FIG. 5, and resultant loss of the heat with offgas from the offgas ducts 11.

As can best be seen in FIG. 3, the ring main 9 of the gas delivery duct assembly is a circular duct that is positioned above the vessel 3. As is described above, the ring main 9 is connected to the hot gas delivery duct 51 and receives oxygen-enriched air from that duct 51.

The ring main 9 includes 4 outlets 65.

The connection members 49 of the gas delivery duct assembly connect together the ring main 9 and the gas injection lances 7.

The hot connection member 49 for each gas injection lance 7 includes a spool 61 that extends from an inlet end of the lance 7 and an expansion joint 63 that is connected at one end to the spool 61 and at the other end to an outlet 65 of the ring main 9.

In use, the gas injection lances 7 receive oxygen-enriched hot air flow via the ring main 9 and the connection members 49 that connect the lances 7 to the ring main 9. The ring main 9 delivers the same flow rate of hot air to each lance 7.

Figure 6:
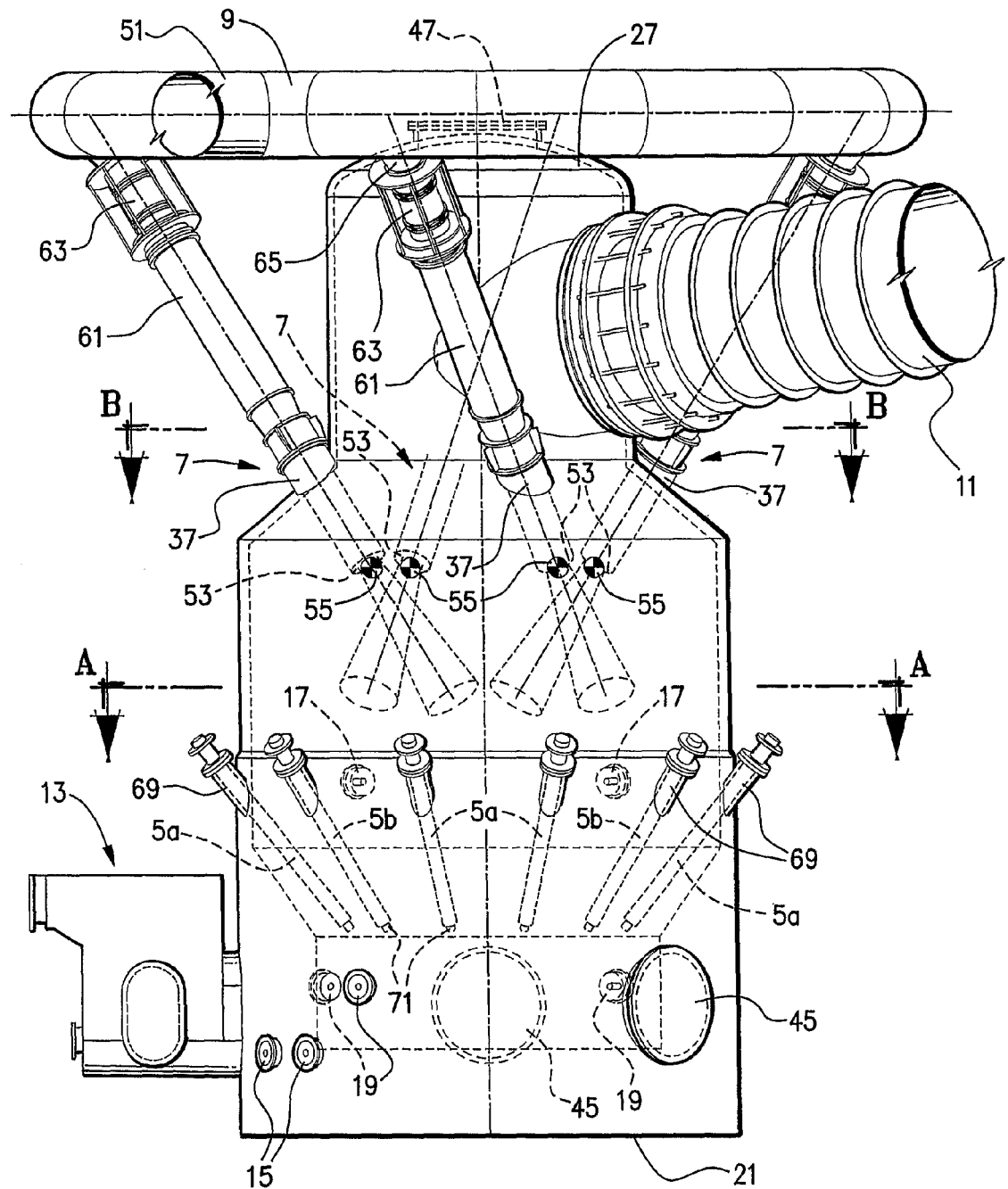
FIG. 6 is a side elevation of the vessel which illustrates the arrangement of solids injection lances and the hot air injection lances of the vessel.
Figure 8:
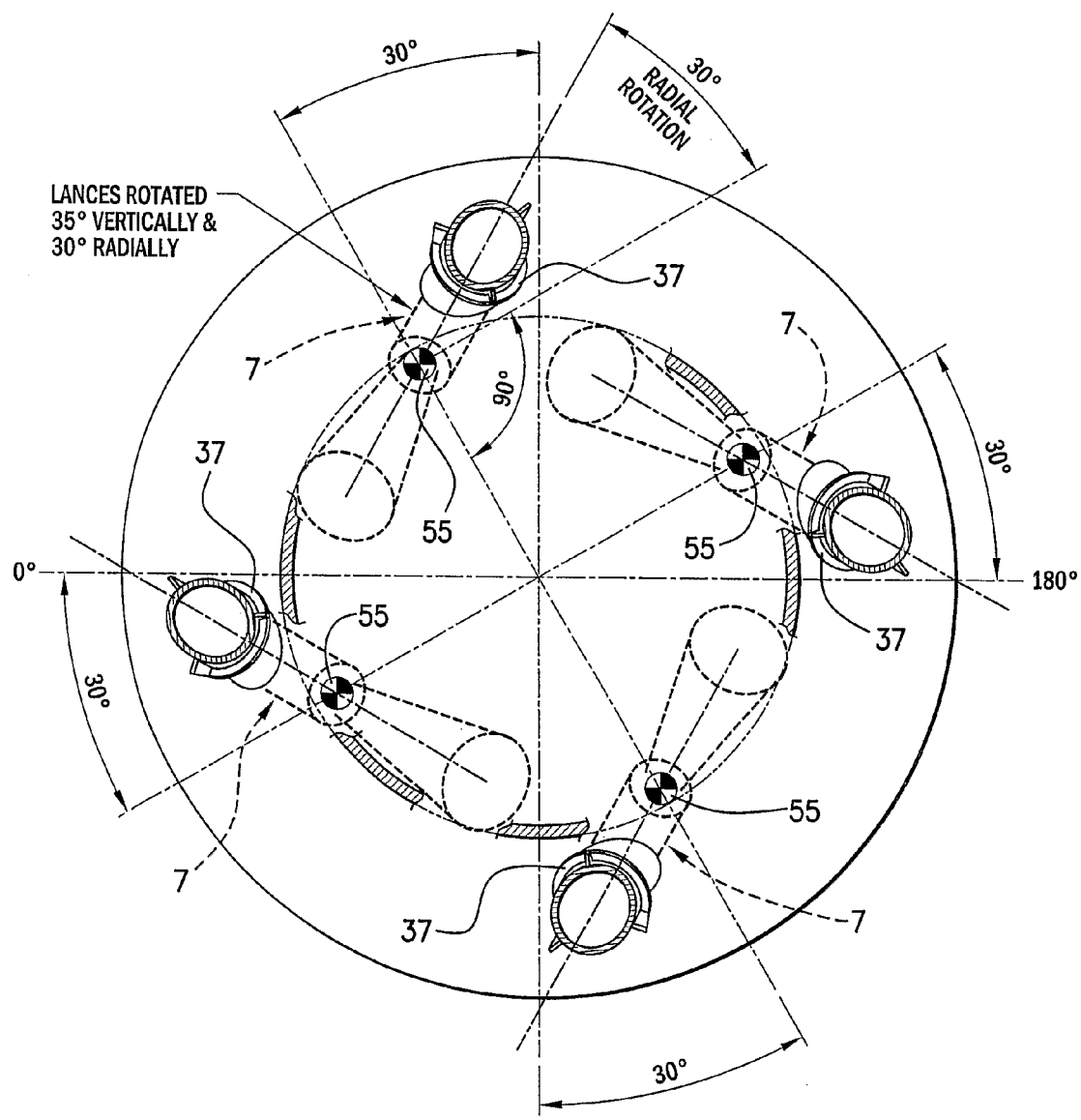
FIG. 8 is a cross-section along the line B-B in FIG. 6.

With reference to FIGS. 6 and 8, the location of each gas injection lance 7 within the vessel 3 can be established theoretically by:

(a) positioning the lance 7 vertically with the tip 53 of the lance 7 in a required position—indicated by the circular icons 55 in FIGS. 6 and 8—and then, (b) with the lance tip 53 fixed, pivoting the lance 35° in a vertical plane that intersects the lance tip 53 and is perpendicular to a radial plane that intersects the lance tip 35 and then, (c) with the lance tip 53 fixed, rotating the lance 30° outwardly towards the radial plane.

The gas injection lances 7 are arranged to be removable from the vessel 3.

Specifically, each lance 7 can be extracted by detaching the spool 61 and the expansion joint 63 of the associated connection member 49 from each lance 7 and the ring main 9, thereafter unbolting the lance 7 from the mounting flange 37 of the lance opening 35 in the frusto-conical section 33 of the side wall 25, and thereafter connecting the lance 7 to an overhead crane (not shown) and lifting the lance 7 upwardly from the opening 35.

Replacement lances 7 can be inserted into the vessel 3 by the reverse procedure to that described in the preceding paragraph.

The 12 solids injection lances 5a, 5b of the solids feed assembly extend downwardly and inwardly through openings (not shown) in the side wall 25 of the lower section 29 of the side wall 25 of the vessel 3 and into the slag layer (not shown) of the molten bath 41. The lances 5a, 5b are arranged so that the tips of the lances are points of an imaginary horizontal circle. The side wall 25 includes mounting flanges 69 and the lances 5a, 5b are mounted onto and supported by the flanges 69.

Figure 7:
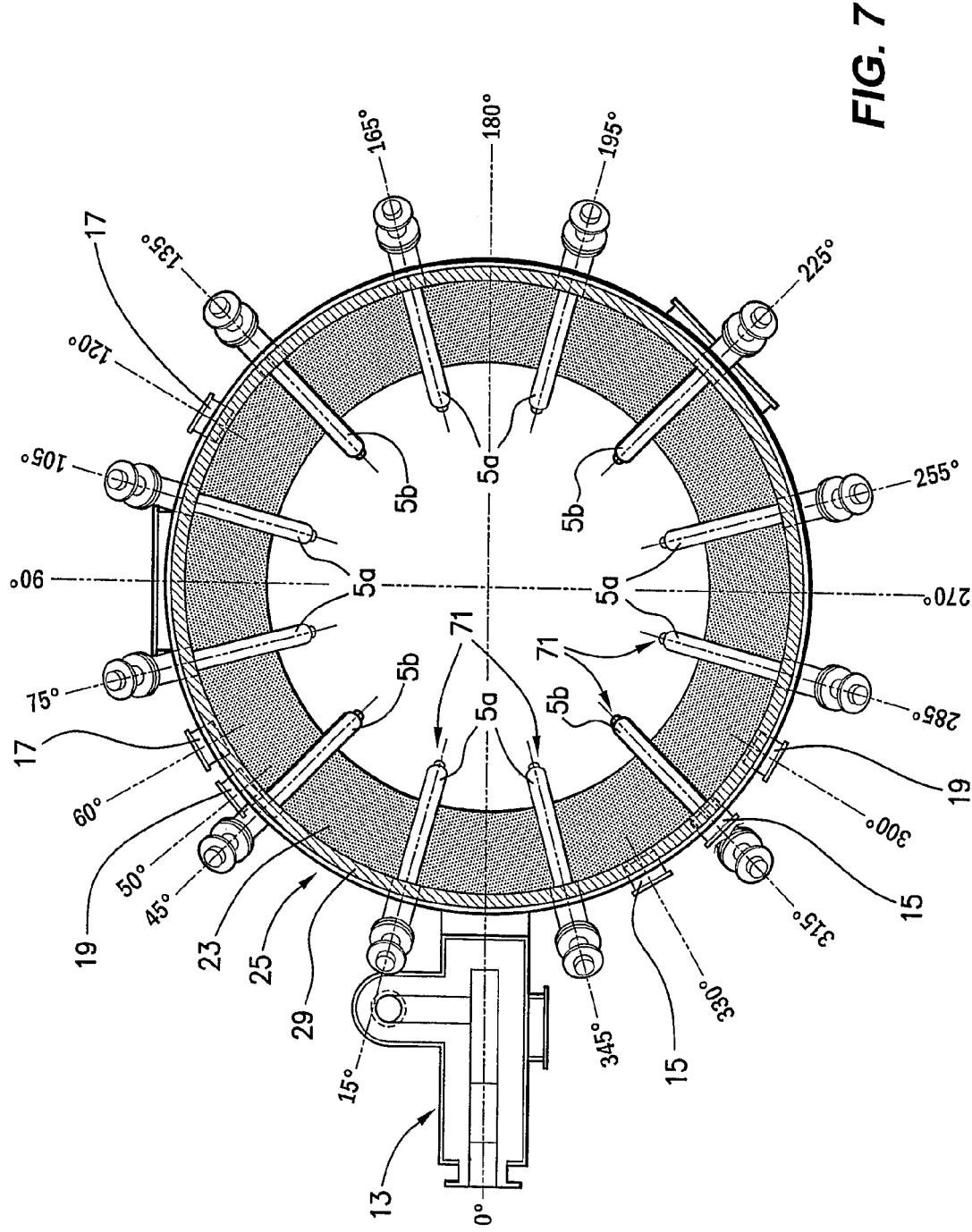
FIG. 7 is a cross-section along the line A-A in FIG. 6.
Figure 9:
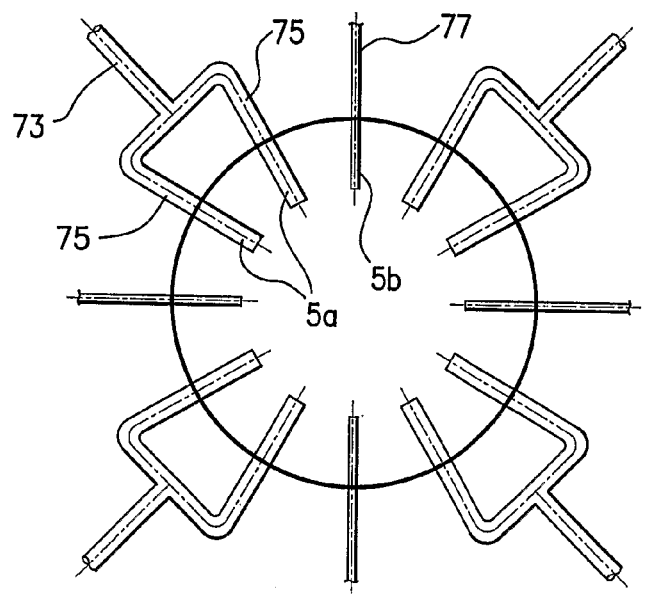
FIG. 9 is a diagram that illustrates the arrangement of solids injection lances in the vessel.

With reference to FIGS. 7 and 9, the solids injection lances 5a, 5b include (a) 8 lances 5a to inject iron ore fines and fluxes into the vessel 3 and (b) 4 lances 5b to inject solid carbonaceous material and fluxes into the vessel 3.

The solid materials are entrained in an oxygen-deficient carrier gas. All of the lances 5a, 5b are the same external diameter and are positioned at the same height of the vessel 3. The lances 5a, 5b are equi-spaced around the circumference of the lower section 29 of the side wall 25 and are arranged so that the iron ore injection lances 5a are arranged in pairs and there is a coal injection lance 5b separating each adjacent pair of iron ore injection lances 5a. The pairing of the iron ore lances 5a to inject hot iron ore into the vessel reduces piping access issues around the vessel.

In use, the iron ore injection lances 5a receive hot iron ore fines and fluxes via a hot ore injection system and the coal injection lances 5b receive coal and fluxes via a carbonaceous material injection system during a smelting operation.

With reference to FIG. 9, the hot ore injection system includes a pre-heater (not shown) to heat the iron ore fines and a hot ore transfer system that includes a series of main supply lines 73 and pairs of branch supply lines 75 for each pair of iron ore injection lances 5a and a supply of carrier gas to transport the hot ore fines in the supply lines 71, 73 and to inject the hot ore fines into the vessel 3 at a temperature of the order of 680° C.

With reference to FIG. 9, the carbonaceous material/flux injection system includes single supply line 77 for each coal injection lance 5b.

The outer diameter of the coal supply lines 75 is less than, typically 40-60% of, the outer diameter of the hot ore branch lines 75. While the internal diameter of the lances 5a, 5b is preferably the same, the need to insulate the hot ore supply lines 75 and the hot ore branch lines 77 significantly increases the outer diameter of the lances. Typically, the hot ore branch lines 75 have the same outer diameter in a range of 400-600 mm and the coal supply lines 77 have the same outer diameter in a range of 100-300 mm. In one particular example, the hot ore branch lines 75 have an outer diameter of 500 mm and the coal supply lines 77 have an outer diameter of 200 mm.

The solids injection lances 5a, 5b are arranged to be removable from the vessel 3.

Specifically, the solid feed assembly includes an assembly to support each solids injection lance 5a, 5b during removal of the lance from the vessel and insertion of a replacement lance into the vessel 3. The support assembly for each lance 5a, 5b includes an elongate track (not shown) extending upwardly and outwardly from the side wall 25 of the vessel 3, a carriage (not shown) movable along the track, and a carriage drive (not shown) operable to move the carriage along the track, with the carriage being connectable to the lances 5a, 5b to enable the lance to be supported on the track and moved upwardly and downwardly by operation of the carriage drive and thereby extracted from the vessel 3. The support assembly is described in International applications PCT/2005/001101 and PCT/AU2005/01103 in the name of the applicant and the disclosure in the International applications is incorporated herein by cross-reference.

As will be evident from the above description, the direct smelting plant accommodates removal and replacement of 16 lances comprising the 4 gas injection lances 7 and the 12 solids injection lances 5a, 5b. The vessel 3 is a relatively compact vessel. This compactness of the vessel 3 and the positions of the ring main 9 and the gas ducts 11 in relation to the vessel 3 places tight space constraints on the removal and replacement of the lances 7, 5a, 5b.

With reference to FIG. 10, in order to facilitate removal and replacement of the lances 7, 5a, 5b, the direct smelting plant includes a plurality of vertically extending overhead crane access zones 97a, 97b.

The access zones 97a are outboard of the ring main 9 and inboard of the outer perimeter 91 of the superstructure 89. There are 12 access zones 97a in total, corresponding to the 12 solids injection lances 5a, 5b. The access zones 97a enable removal and replacement of the solids injection lances 5a, 5b.

The access zones 97b are inboard of the ring main 9. There are 4 access zones 97b in total, corresponding to the 4 gas injection lances 7. The access zones 97b enable removal and replacement of the gas injection lances 7.

The pair of offgas ducts 11 of the offgas duct assembly allow offgas produced in a HIsmelt process operating in the vessel 3 to flow from the vessel 3 for downstream processing before being released to the atmosphere.

Figure 13:
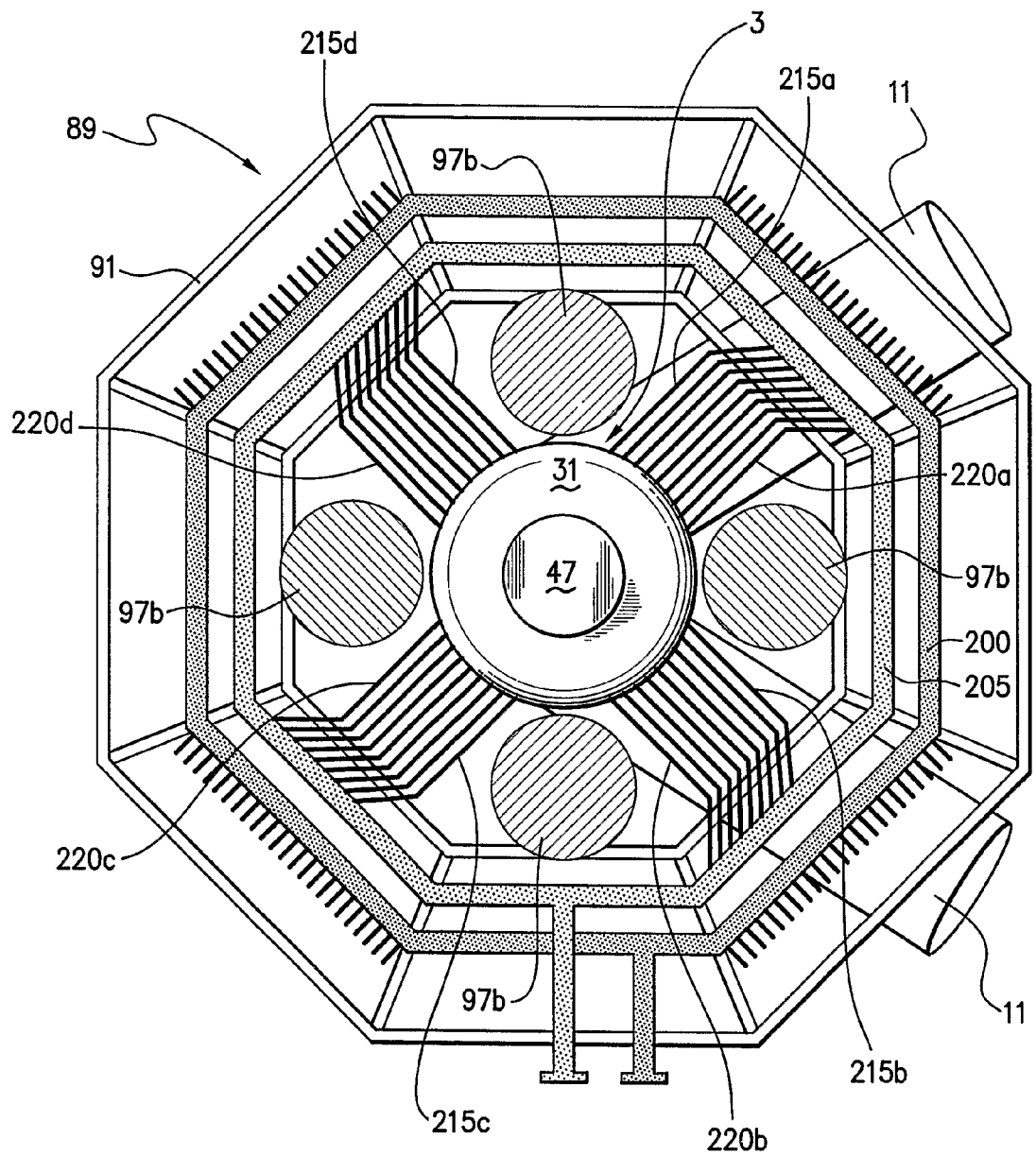
FIG. 13 is a top plan view of the vessel showing water cooling headers and supply piping.

With reference to FIG. 13, there is provided a top view of superstructure 89 showing upper cylindrical section 31 of vessel 3, access zones 97b, water cooling supply header 200, water cooling return header 205 along with water cooling supply and return pipes 215.

The water cooling supply header 200 and the water cooling return header are each provided in the form of a ring main. Each header 200, 205 sits vertically above and in substantial alignment with the ring main 9 (not shown in the Figure). Water cooling supply and return piping 215 extends between the water cooling supply and return headers 200, 205 and outlets of water cooling panels located on the vessel 3. Four sets 215a, 215b. 215c, 215d of water cooling supply and return piping 215 are distributed around the superstructure 89 and the vessel 3. Each set bridges between the headers 200, 205 and the vessel 3 in a discrete region 220a, 220b, 220c, 220d of the superstructure 89. This allows the access zones 97b to extend upwardly between each set 215a, 215b, 215c, 215d of water cooling supply and return piping 215. Some of the water cooling supply and return pipes 215 extend across the face of the vessel 3 from an area of the discrete region 220a, 220b, 220c, 220d, that is adjacent the vessel 3 to various water cooling panel outlets located between the side wall 25 of the vessel 3 and the access zones 97b. In this way it can be seen that the water cooling supply and return pipes 215 define, at least in part, the external periphery of the access zones 97b.

Figure 14:
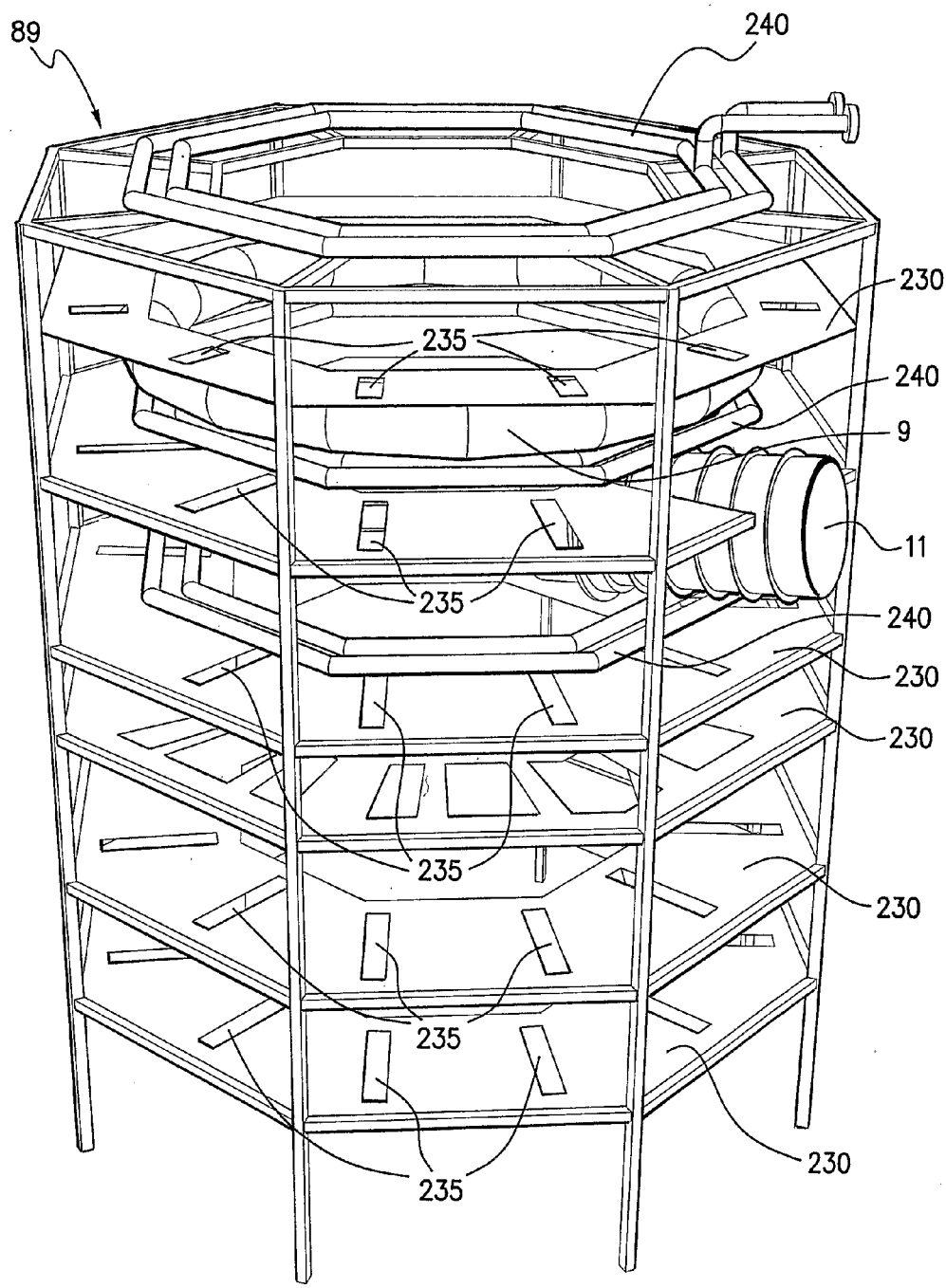
FIG. 14 is an isometric view of the superstructure that supports that the hot air blast delivery system, the off-gas ducts and the water cooling system.

With reference to FIG. 14, there is provided an isometric view of the superstructure 89, showing access floors 230 that provide personnel with access to equipment located on the superstructure. The floors 230 have apertures 235 that provide for access zones 97a. A series of water cooling supply and return headers 240 are provided at differing heights on the superstructure (including the headers 200 and 205 referred to in relation to FIG. 13 above). The headers 240 are located on the superstructure so as to be in substantial vertical alignment with the ring main 9 of the gas delivery duct assembly. Each header 240 allows for the supply and the return of cooling water to water cooling panels located in an adjacent section of the vessel. Each header 240 is typically a ring main.

Access zones 97a extend upwardly and outwardly from adjacent the vessel 3, between the supply headers 240, to a region of the superstructure 89 external to the supply headers 240. Access zones 97a extend upwardly from the region external to the supply headers 240, passing through the various floors 230 of the superstructure.

As is indicated above, the HIsmelt process preferably operates with air or oxygen-enriched air and therefore generates a substantial volume of offgas and requires relatively large diameter offgas ducts 11.

The offgas ducts 11 extend from the upper section 31 of the side wall 25 at an angle of 7° to the horizontal.

Figure 11:
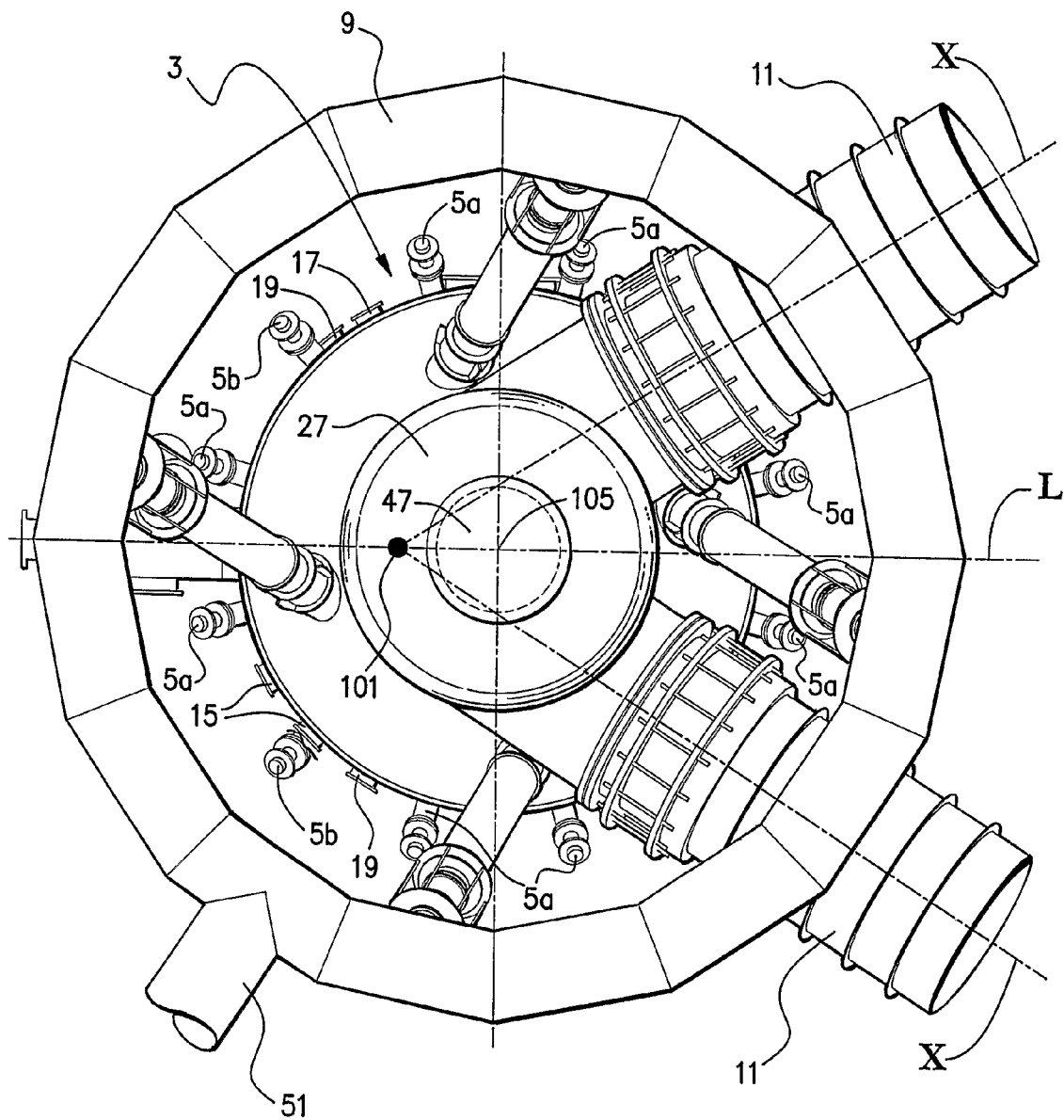
FIG. 11 is a top plan view of the vessel.
Figure 12:
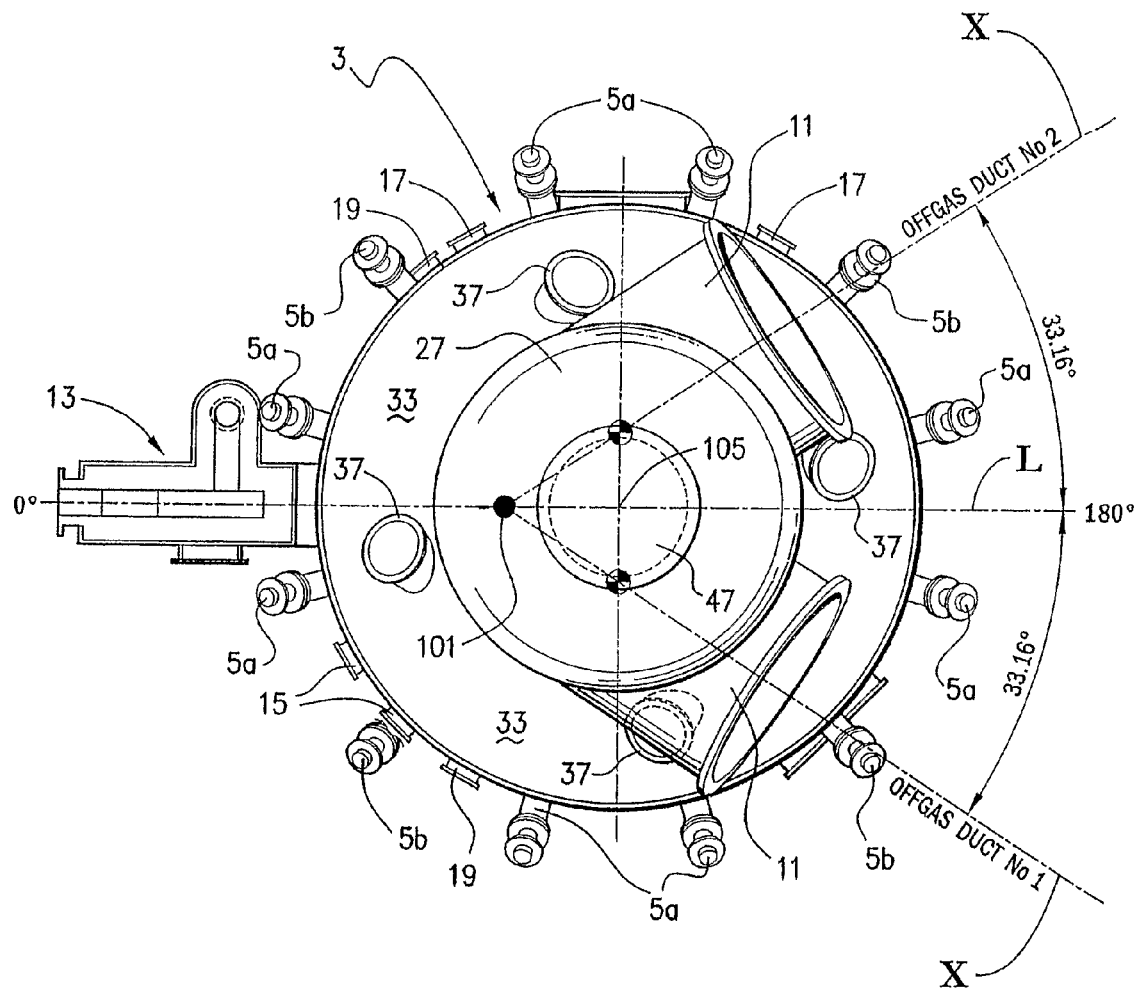
FIG. 12 is a top plan view of the vessel with the off-gas duct and the hot air blast delivery system removed.

As can best be seen in FIGS. 11 and 12, the offgas ducts 11 describe a V-shape when viewed from above the vessel 3. The longitudinal axes X of the offgas ducts 11 describe an angle of 66.32°. The offgas ducts are positioned so that the central axes X of the ducts 11 intersect each other and a point 101 on a radial line L that extends from a central vertical axis 105 of the vessel 3. In other words, the axes X of the offgas ducts 11 are not radials from the central vertical axis 105 of the vessel 3.

With reference to FIGS. 1 and 2, the direct smelting plant includes separate offgas hoods 107 connected to each offgas duct 11 to cool offgas from the vessel 3. The offgas hoods 107 extend vertically upwardly from the outlet ends of the offgas ducts 11. The offgas hoods 107 cool offgas from the vessel 3 via heat exchange with water/steam passing through the hoods to a temperature of the order of 900-1100° C.

With further reference to FIGS. 1 and 2, the direct smelting plant also includes separate offgas scrubbers 109 connected to each offgas hood 107 to remove particulates from cooled offgas. Additionally, each offgas hood 107 is connected to a flow control valve (not shown) that controls the flow of offgas from the vessel and through the offgas hood 107. The flow control valves may be incorporated with the offgas scrubbers 109.

With further reference to FIGS. 1 and 2, the direct smelting plant also includes a single offgas cooler 111 connected to both offgas scrubbers 109. In use, the offgas cooler 111 receives scrubbed offgas streams from both of the offgas scrubbers 109 and cools the offgas to a temperature of the order of 25-40° C.

In use, the cooled offgas from the offgas cooler 111 is processed as required, for example by being used as a fuel gas in stoves (not shown) or a waste heat boiler (not shown) to recover chemical energy form the offgas, and thereafter released into the atmosphere as a clean offgas.

The direct smelting plant also includes a metal tapping assembly that includes a forehearth 13 to tap molten iron continuously from the vessel 3. Hot metal produced during a smelting operation is discharged from the vessel 3 through the forehearth 13 and a hot metal launder (not shown) connected to the forehearth 13. The outlet end of the hot metal launder is positioned above a hot metal ladle station (not shown) to supply molten metal downwardly to ladles located at the station.

The direct smelting plant also includes an end metal tapping assembly to tap molten iron from the vessel 3 at the end of a smelting operation out of the lower part of the vessel 3 and to transport the molten iron away from the vessel 3. The end metal tapping assembly includes a plurality of metal end tap holes 15 in the vessel 3.

The direct smelting plant also includes a slag tapping assembly to tap molten slag from the vessel 3 periodically from the lower part of the vessel and to transport the slag away from the vessel 3 during a smelting operation. The slag tapping assembly includes a plurality of slag notches 17 in the vessel 3.

The direct smelting plant also includes a slag end tapping assembly to drain slag from the vessel 3 at the end of a smelting operation. The slag end tapping assembly includes a plurality of slag tap holes 19 in the vessel 3.

In a smelting operation in accordance with the HIsmelt process, iron ore fines and a suitable carrier gas and coal and a suitable carrier gas are injected into the molten bath through the lances 5a, 5b. The momentum of the solid materials and the carrier gases causes the solid materials to penetrate the metal layer of the molten bath 41. The coal is devolatilised and thereby produces gas in the metal layer. Carbon partially dissolves in the metal and partially remains as solid carbon.

The iron ore fines are smelted to molten iron and the smelting reaction generates carbon monoxide. Molten iron is removed continuously from the vessel 3 via the forehearth 13.

Molten slag is removed periodically from the vessel 3 via the slag notches 17.

The gases that are transported into the metal layer and generated by devolatilisation and smelting reactions produce significant buoyancy uplift of molten metal, solid carbon and slag (drawn into the metal layer as a consequence of solid/gas/injection) from the metal layer which generates upward movement of splashes, droplets and streams of molten metal and slag, and these splashes, droplets and streams entrain slag as they move through the slag layer. The buoyancy uplift of molten metal, solid carbon and slag causes substantial agitation of the slag layer, with the result that the slag layer expands in volume. In addition, the upward movement of splashes, droplets and streams of molten metal and slag—caused by buoyancy uplift of molten metal, solid carbon and slag—extend into the space above the molten bath and forms the above-described fountain.

Injection of the oxygen-containing gas into the fountain via the gas injection lances 7 post-combusts reaction gases, such as carbon monoxide and hydrogen, in the vessel 3. Heat generated by the post combustion is transferred to the molten bath when molten material falls back into the bath.

Offgas resulting from the post-combustion of reaction gases in the vessel 3 is taken away from the vessel 3 through the offgas ducts 11.

Many modifications may be made to the embodiment of the present invention described above without departing from the spirit and scope of the invention.

By way of example, whilst the embodiment described above includes 2 offgas ducts 11, the present invention is not limited to this number of offgas ducts 11 and extends to any suitable number of offgas ducts 11.

In addition, whilst the embodiment described above includes a ring main 9 to deliver the oxygen-containing gas to the gas injection lances 7, the present invention is not limited to this arrangement and extends to any suitable gas delivery assembly.

In addition, whilst the embodiment described above includes 4 gas injection lances 7, the present invention is not limited to number and the arrangement of the lances 7 and extends to any suitable number and arrangement of the lances 7.

In addition, whilst the embodiment described above includes 12 solids injection lances 5a, 5b, with 8 lances 5a being iron ore injection lances arranged in pairs and the remaining 4 lances 5b being coal injection lances, the present invention is not limited to this number and arrangement of the lances 5a, 5b.

In addition, whilst the embodiment described above includes a forehearth 13 to tap molten iron continuously from the vessel 3, the present invention is not limited to the use of the forehearth and to continuous tapping of molten iron.

The invention claimed is:

1. A direct smelting plant for producing molten metal from a metalliferous feed material using a molten bath based direct smelting process that includes:

(a) a fixed direct smelting vessel to hold a molten bath of metal and slag and a gas space above the bath, the vessel including a hearth and a side wall;

(b) a solids feed assembly to supply solid feed material, including metalliferous feed material and carbonaceous material, from a solid feed material supply location away from the vessel into the vessel, the solids feed assembly including a plurality of solids injection lances extending through openings in the side wall of the vessel;

(c) an oxygen-containing gas feed assembly to supply an oxygen-containing gas from an oxygen-containing gas supply location away from the vessel into the vessel, the oxygen-containing gas feed assembly including a gas delivery main and a plurality of gas injection lances extending through openings in the side wall of the vessel to inject the oxygen-containing gas supplied via the gas delivery main into the gas space, the gas delivery main extending around at least a majority of a perimeter of the vessel and spaced away from the vessel;

(d) an offgas duct assembly to facilitate flow of offgas from he vessel;

(e) a metal tapping assembly to tap molten metal from the bath during a smelting operation;

(f) a slag tapping assembly to tap slag from the bath during a smelting operation; and (g) a superstructure surrounding the vessel and supporting the gas delivery main and wherein the superstructure is configured with crane access zones inboard of the gas delivery main to enable the gas injection lances to be removed from and replacement lances to be positioned in the openings in the side wall of the vessel and configured with crane access zones outboard of the gas delivery main and inboard of an outer perimeter of the superstructure to enable the solids injection lances to be removed from and replacement lances to be positioned in the openings in the side wall of the vessel.

2. The plant defined in claim 1 wherein the gas delivery main is spaced away from the vessel so that there is a clearance between the vessel and the gas delivery main that makes it possible to remove the gas injection lances through the clearance.

3. The plant defined in claim 1 wherein the gas delivery main is located above connections of the gas injection lances to the vessel.

4. The plant defined in claim 1 wherein the gas delivery main is a ring main that defines an endless path for gas flow within the main.

5. The plant defined in claim 1 wherein the gas delivery main is a horseshoe main.

6. The plant defined in claim 1 wherein each gas injection lance is arranged to direct a stream of gas downwardly and outwardly of a central core of the vessel.

7. The plant defined in claim 1 wherein each gas injection lance is arranged to direct a stream of gas downwardly and outwardly towards the side wall of the vessel.

8. The plant defined in claim 1 wherein each gas injection lance is positioned such that the lance points downwardly into the vessel and is angled in relation to a vertical plane and a radial plane in the vessel so that the direction of flow of a stream of gas from the lance has radial and circumferential components.

9. The plant defined in claim 1 wherein the solids feed assembly includes a plurality of solids injection lances that extend downwardly and inwardly through openings in the side wall of the vessel, and the solids injection lances include a plurality of lances to inject metalliferous material into the vessel and a plurality of lances to inject solid carbonaceous material into the vessel, the metalliferous material injection lances being positioned in pairs around the perimeter of the side wall of the vessel, and a single solid carbonaceous material injection lance being positioned between adjacent pairs of the metalliferous material injection lances.

10. The plant defined in claim 9 wherein the solids feed assembly includes a main supply line for each pair of metalliferous injection lances and a pair of branch lines that extend from the main line and are connected to the lances.

11. The plant defined in claim 10 wherein the solids feed assembly includes a hot metalliferous feed material injection system for supplying pre-heated metalliferous feed material into the main supply line for each pair of the metalliferous feed material injection lances.

12. The plant defined in claim 1 wherein the superstructure also includes a plurality of platforms that provide workman access to the vessel at different heights of the vessel.

13. The plant defined in claim 1 wherein the offgas duct assembly includes two offgas ducts extending outwardly from the vessel.

14. The plant defined in claim 13 wherein the offgas ducts are of matching diameter.

15. The plant defined in claim 13 wherein the offgas ducts are of matching length.

16. The plant defined in claim 13 comprising two offgas hoods to cool offgas, with one the offgas hoods being connected to one of the offgas ducts.

17. The plant defined in claim 16 wherein each offgas hood is adapted to cool offgas to a temperature of the order of 900-1100° C.

18. The plant defined in claim 16 includes a separate offgas scrubber to remove particulates from offgas that is connected to each offgas hood.

19. The plant defined in claim 16 includes a single offgas cooler connected to both offgas scrubbers.

20. The plant defined in claim 1 wherein the side wall of the vessel includes:
(a) a lower cylindrical section,
(b) an upper cylindrical section that has a smaller diameter than the lower section, and
(c) a transition section that interconnects the upper and lower sections.

21. The plant defined in claim 20 wherein the offgas duct assembly extends from the upper cylindrical section.

22. The plant defined in claim 20 wherein the transition section includes the openings for the gas injection lances and the lances extend through the openings into the vessel.

23. The plant defined in claim 20 wherein the lower cylindrical section includes the openings for the solids injection lances, and the lances extend through the openings into the vessel.

24. The plant defined in claim 1 wherein the metalliferous material includes iron ore.

25. The plant defined in claim 1 wherein the carbonaceous material includes coal.

26. The plant defined in claim 1 further including cooling water header pipes for supply of cooling water to the vessel, the cooling water header pipes located above the gas feed assembly and a plurality of cooling water supply and return pipes extending between the cooling water headers and the vessel and distributed about the cooling water header pipes intermediate the crane access zones positioned inboard of the gas delivery main.

27. The plant defined in claim 26 wherein the cooling water supply and return pipes are distributed about the cooling water header pipes so as to provide, at least in part, one or more external peripheries of the crane access zones positioned inboard of the gas delivery main.

28. The plant defined in claim 26 wherein the water supply and return pipes are distributed about the cooling water headers in a plurality of separate zones that are spaced apart from one another.

29. The plant defined in claim 26 wherein the cooling water headers extending at least substantially around the vessel.

30. The plant defined in claim 29 wherein the cooling water headers are located vertically above and in substantial alignment with the gas delivery main of the gas feed assembly.

31. The plant defined in claim 26 and further including a plurality of cooling water headers extending substantially around the vessel, and located at different vertical heights so as to supply water to different areas of the vessel and the headers in substantial alignment with the gas delivery main of the gas feed assembly.

* * * * *